US011777702B2

(12) United States Patent
Doppalapudi et al.

(10) Patent No.: US 11,777,702 B2
(45) Date of Patent: Oct. 3, 2023

(54) CLOSED LOOP LANE SYNCHRONIZATION FOR OPTICAL MODULATION

(71) Applicant: MACOM Technology Solutions Holdings, Inc., Lowell, MA (US)

(72) Inventors: Naga Rajesh Doppalapudi, Santa Clara, CA (US); Echere Iroaga, Mountain View, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/317,710

(22) Filed: May 11, 2021

(65) Prior Publication Data

US 2021/0306132 A1  Sep. 30, 2021

Related U.S. Application Data

(63) Continuation-in-part of application No. 16/818,832, filed on Mar. 13, 2020, now Pat. No. 11,314,107, which is a continuation-in-part of application No. PCT/US2019/051839, filed on Sep. 19, 2019, said application No. 16/818,832 is a continuation-in-part of application No. 16/143,493, filed on Sep. 27, 2018, now Pat. No. 10,784,845.

(60) Provisional application No. 63/023,182, filed on May 11, 2020.

(51) Int. Cl.
*H04L 7/00* (2006.01)
*H04B 10/50* (2013.01)

(52) U.S. Cl.
CPC .......... *H04L 7/0075* (2013.01); *H04B 10/50* (2013.01)

(58) Field of Classification Search
CPC ..... H04L 7/0075; H04L 7/0037; H04B 10/50; H04B 10/07; H04B 17/10; G06F 1/10; H05K 1/0248; H03K 5/14; H03K 5/13; H03K 5/135
See application file for complete search history.

(56) References Cited

U.S. PATENT DOCUMENTS

| | | |
|---|---|---|
| 1,533,959 A | 8/1985 | Sakurai |
| 5,105,293 A | 4/1992 | Bortolini |
| 5,272,728 A * | 12/1993 | Ogawa ...................... G06F 5/06 375/372 |
| 6,208,181 B1 | 3/2001 | Johnson |
| 7,965,946 B2 * | 6/2011 | Conroy ............. H04B 10/0795 398/205 |
| 8,422,478 B2 | 4/2013 | Okamoto |
| 8,432,936 B2 | 4/2013 | Ling |

(Continued)

FOREIGN PATENT DOCUMENTS

WO    2009036390    3/2009

OTHER PUBLICATIONS

Frans; et al. IEEE Journal. "A 40 to-64 GB/s NRZ Transmitter With Supply-Regulated Front-End in 16 nm FinFET." vol. 51, No. 12. Dec. 2016. 11pp.

(Continued)

*Primary Examiner* — Sophia Vlahos

(57) ABSTRACT

A system for transmitting signals via serial links includes a plurality of lanes for combining data onto a transmission media, a skew detector configured to detect skew among two of the plurality of lanes, and a variable delay circuit controlled by the skew detector, configured to delay the start of a clock signal to circuitry of one of the plurality of lanes.

19 Claims, 8 Drawing Sheets

(56) References Cited

U.S. PATENT DOCUMENTS

| | | | |
|---|---|---|---|
| 8,461,858 B1* | 6/2013 | Singh | G01R 31/31721 |
| | | | 324/762.01 |
| 8,726,131 B2 | 5/2014 | Jongren et al. | |
| 8,848,747 B2 | 9/2014 | Zeng et al. | |
| 8,976,838 B2 | 3/2015 | Jaeckel et al. | |
| 9,184,834 B1 | 11/2015 | Zhang et al. | |
| 9,212,912 B1* | 12/2015 | Salit | G01C 19/727 |
| 9,237,001 B1 | 1/2016 | Song et al. | |
| 9,548,858 B1 | 1/2017 | Cirit et al. | |
| 9,634,743 B2 | 4/2017 | Sun | |
| 9,705,592 B1 | 7/2017 | Schmogrow et al. | |
| 10,313,099 B1 | 6/2019 | Li et al. | |
| 11,314,107 B2 | 4/2022 | Doppalapudi et al. | |
| 2001/0036005 A1* | 11/2001 | Hatayama | G02F 1/225 |
| | | | 359/337.1 |
| 2002/0007475 A1 | 1/2002 | Crozier | |
| 2004/0161068 A1 | 8/2004 | Zerbe et al. | |
| 2005/0129408 A1 | 6/2005 | Kim et al. | |
| 2006/0008030 A1 | 1/2006 | Luke et al. | |
| 2006/0072922 A1* | 4/2006 | MacDonald | H04B 10/85 |
| | | | 398/152 |
| 2007/0217738 A1* | 9/2007 | Anderegg | G02B 6/26 |
| | | | 385/32 |
| 2008/0012633 A1 | 1/2008 | Kim | |
| 2008/0036509 A1 | 2/2008 | Jang | |
| 2008/0149457 A1 | 6/2008 | Matheisl et al. | |
| 2008/0175586 A1 | 7/2008 | Perkins et al. | |
| 2009/0003755 A1* | 1/2009 | Liu | G02F 1/2257 |
| | | | 385/3 |
| 2009/0074407 A1* | 3/2009 | Hornbuckle | H04B 10/5561 |
| | | | 398/43 |
| 2009/0317090 A1* | 12/2009 | Conroy | H04B 10/532 |
| | | | 398/184 |
| 2010/0080570 A1 | 4/2010 | Conroy et al. | |
| 2010/0120390 A1 | 5/2010 | Panikkath et al. | |
| 2010/0129088 A1 | 5/2010 | Akasaka et al. | |
| 2011/0044702 A1* | 2/2011 | Mizuguchi | H04J 14/06 |
| | | | 398/184 |
| 2012/0250793 A1 | 10/2012 | Khatana et al. | |
| 2013/0229211 A1 | 9/2013 | Nishiyama et al. | |
| 2014/0253195 A1 | 9/2014 | Chandrasekaran et al. | |
| 2015/0222254 A1 | 8/2015 | Walker | |
| 2016/0006538 A1* | 1/2016 | Yoshida | H04B 10/6162 |
| | | | 398/65 |
| 2016/0180898 A1* | 6/2016 | Hwang | G06F 13/16 |
| | | | 711/103 |
| 2017/0033774 A1 | 2/2017 | Hedayati et al. | |
| 2017/0149457 A1 | 5/2017 | Mayer et al. | |
| 2017/0264304 A1 | 9/2017 | Dedic et al. | |
| 2018/0137902 A1 | 5/2018 | Giovannini et al. | |
| 2018/0367220 A1 | 12/2018 | Nomura et al. | |
| 2019/0089479 A1* | 3/2019 | Yamauchi | H04B 10/532 |
| 2019/0123728 A1 | 4/2019 | Zhao et al. | |
| 2019/0131945 A1 | 5/2019 | Lakshmikumar et al. | |
| 2019/0149388 A1 | 5/2019 | Torbatian | |
| 2019/0215146 A1 | 7/2019 | Ke et al. | |
| 2019/0272804 A1 | 9/2019 | Amirkhany et al. | |
| 2019/0326998 A1 | 10/2019 | Chen et al. | |

OTHER PUBLICATIONS

Wu et al. IEEE Journal. "A 20 GB/s NRZ/PAM-4 1V transmitter in 40 nm CMOS driving a Si-photonic modulator in 0.13um CMOS", ISSCC 2013. 4pp.

S. Moazeni. Article. "A 40-GB/s PAM-4 Transmitter Based on a Ring Resonator Optical DAC in 45-nm SOI COMS", JSSC, Dec. 2017. 4pp.

* cited by examiner

CLOSED LOOP LANE SYNCHRONIZATION FOR OPTICAL MODULATION

RELATED APPLICATION(S)

This Application claims priority to commonly owned U.S. Provisional Application 63/023,182 filed 11 May 2020, entitled "Closed Loop Lane Synchronization for Optical Modulation" to Doppalapudi and Iroaga, which is incorporated herein by reference in its entirety. This Application is a Continuation-in-Part Application of co-pending, commonly owned U.S. patent application Ser. No. 16/818,832, filed Mar. 13, 2020, entitled "Optical Modulation Skew Adjustment Systems and Methods" to Doppalapudi and Echere, which in turn was a Continuation-in-Part Applications of co-pending USPTO application Ser. No. 16/143,493 entitled "Error Detection and Compensation for a Multiplexing Transmitter" filed on Sep. 27, 2018, and PCT Application Number PCT/US19/51839 Entitled "Error Detection and Compensation for a Multiplexing Transmitter" filed Sep. 19, 2019, all of which are incorporated herein by reference in their entireties.

The present application is related to U.S. Pat. No. 8,766,681 and to U.S. Pat. No. 10,313,099, all of which are incorporated herein by reference in their entireties.

FIELD OF INVENTION

Embodiments of the present invention relate to the field of optical communications. More specifically, embodiments of the present invention relate to systems and methods for closed loop lane synchronization for optical modulation.

BACKGROUND

A typical communications link may include a PAM-4 (Pulse Amplitude Modulation with 4 levels) or QAM (Quadrature Amplitude Modulation) transmitter and receiver in conjunction with an optical transmitter and/or receiver. It is appreciated that QAM is applicable to other wireless communications, e.g., RF (Radio Frequency) communications. Frequently, an optical transmitter drives an MZI (Mach-Zehnder-Interferometer) optical modulator.

It is beneficial to utilize multiple "lanes" of driver/modulation components. Multi-lane coherent transceivers are commonly used to increase the amount of data that can be transmitted. For example, a four-lane synchronous transceiver can output four times as much data as a transceiver with only a single output.

In operation, a multi-lane coherent transceiver can receive low-speed digital input signals, such as from a Digital Signal Processing (DSP) unit, and then serialize the input signals using a high-speed clock to form a number of high-speed digital signals. The high-speed digital signals drive analog drivers, which output corresponding analog signals.

Multi-lane coherent transceivers commonly utilize a clock generation circuit that includes a phase-lock-loop (PLL) and a frequency divider. The PLL generates the high-speed clock signal, which is fanned out to each of the lanes, while the frequency divider divides down the high-speed clock signal to form a low-speed clock signal, which is also fanned out to each of the lanes.

The order of the serialized high-speed data is determined by a reset signal that gates or enables the frequency divider. The reset signal is generated by a state machine which is controlled by software or firmware, and therefore the reset signal is not synchronous to the high-speed clock signal in each lane.

Unfortunately, due to the physical layout of an integrated circuit, e.g., varying lengths of signal traces and/or varying numbers of buffers required for signal integrity, and the variability of analog characteristics of an integrated circuit, e.g., causing different gate delays in similar circuits, there may be a timing difference, or skew, between signals to different lanes. Such a skew may degrade performance and/or result in catastrophic functional failure of the transmitter.

SUMMARY OF THE INVENTION

Therefore, what is needed are systems and methods for closed loop lane synchronization for optical modulation.

In accordance with an embodiment of the present invention, a system for transmitting signals via serial links includes a plurality of lanes for combining data onto a transmission media, a skew detector configured to detect skew among two of the plurality of lanes, and a variable delay circuit controlled by the skew detector, configured to delay the start of a clock signal to circuitry of one of the plurality of lanes.

In accordance with another embodiment of the present invention, a system for transmitting signals via serial links includes a plurality of lanes for combining data onto a transmission media, and a skew adjustment circuit configured to adjust skew between two of the plurality of lanes in a closed loop manner.

In accordance with a further embodiment of the present invention, a system for transmitting signals via optical serial links includes a plurality of lanes for combining data onto an optical transmission waveguide, and a skew adjustment component for each of the plurality of lanes, configured to adjust skew of a respective lane responsive to an output of a skew detector. The skew detector is configured to detect skew among two adjacent lanes. The system further includes a variable delay circuit controlled by the skew detector, configured to delay the start of a clock signal to circuitry of one of the plurality of lanes.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations performed by electronic devices and/or circuits. These descriptions and representations are the means used by those skilled in the electronic arts to most effectively convey the substance of their work to others skilled in the art. In the present application, a procedure, a method, logic block, process, or the like, is conceived to be a self-consistent sequence of operations or instructions leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "filtering," "slicing," "improving," "updating," "accessing," or the like, refer to actions and processes (e.g., method 700 of FIG. 7) of electronic devices and/or electronic circuits, including, for example, integrated circuits.

Closed Loop Lane Synchronization for Optical Modulation

Figure 1:
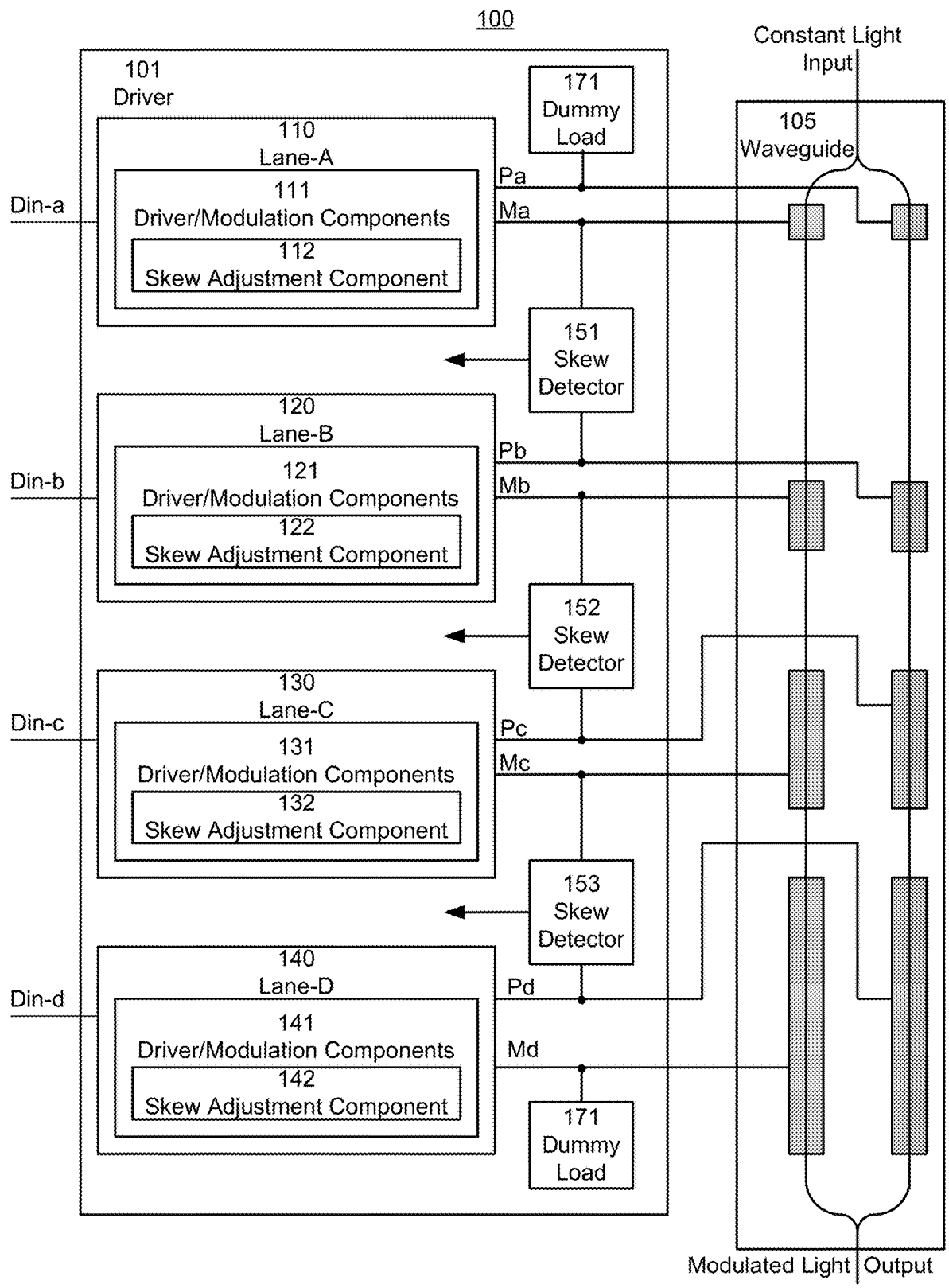
FIG. 1 illustrates an exemplary block diagram of an on-chip optical system, in accordance with embodiments of the present invention.

FIG. 1 illustrates an exemplary block diagram of an on-chip optical system 100, in accordance with embodiments of the present invention. Optical system 100 includes driver 101 and waveguide 105. Driver 101 includes lanes 110 through 140 and skew detectors 151 through 153. Lanes 110 through 140 include respective driver/modulation components 111 through 141. Driver/modulation components 111 through 141 include respective skew adjustment components 112 through 142. Data input a through d (Din-a through Din-d) is fed into the respective diver/modulation components 111 through 141. The driver/modulation components 111 through 141 generate respective initial modulation driver signal sets Pa/Ma through Pd/Md which are forwarded to waveguide 105. One signal from a set and another signal from another set are forwarded to a skew detector which detects skew differences between the respective signals. The on-chip optical system 100 can include dummy loads 171 and 172 coupled to the Pa and Md signals that are not coupled to a skew detector.

In one embodiment, the modulation driver signals in a respective lane are 180 degrees out of phase with one another. In one exemplary implementation, the P signal is considered a positive signal and the M signal is considered a negative signal. In one embodiment, Ma from lane 110 and Pb from lane 120 are fed into skew detector 151 which detects skew differences between the respective signals of lane 110 and lane 120; Mb from lane 120 and Pc from lane 130 are fed into skew detector 152 which detects skew differences between the respective signals of lane 120 and lane 130; and Mc from lane 130 and Pd from lane 140 are fed into skew detector 153 which detects skew differences between the respective signals of lane 130 and lane 140.

Skew adjustment components 112 through 142 automatically adjust the respective modulated driver signals in accordance with the detected skew. The skew adjusted modulated driver signals are fed into waveguide 105 and modulate the constant light input signal to produce a modulated light output signal. In one embodiment, skew adjusted electrical signals are utilized to drive light emitting devices which emit light the modulate intensity (e.g., constructively, destructively, etc.) of the light output of waveguide 105. In one exemplary implementation, the skew adjusted modulated driver light signals are fed to the waveguide phase shifters to modulate the light signal in the waveguide 105 (e.g., similar to Mach-Zehnder approaches, etc.). The modulated light output signal can be compatible with various communication standards (e.g., NRZ, PAM-4, PAM-16, PAN-N, etc.).

Figure 2:
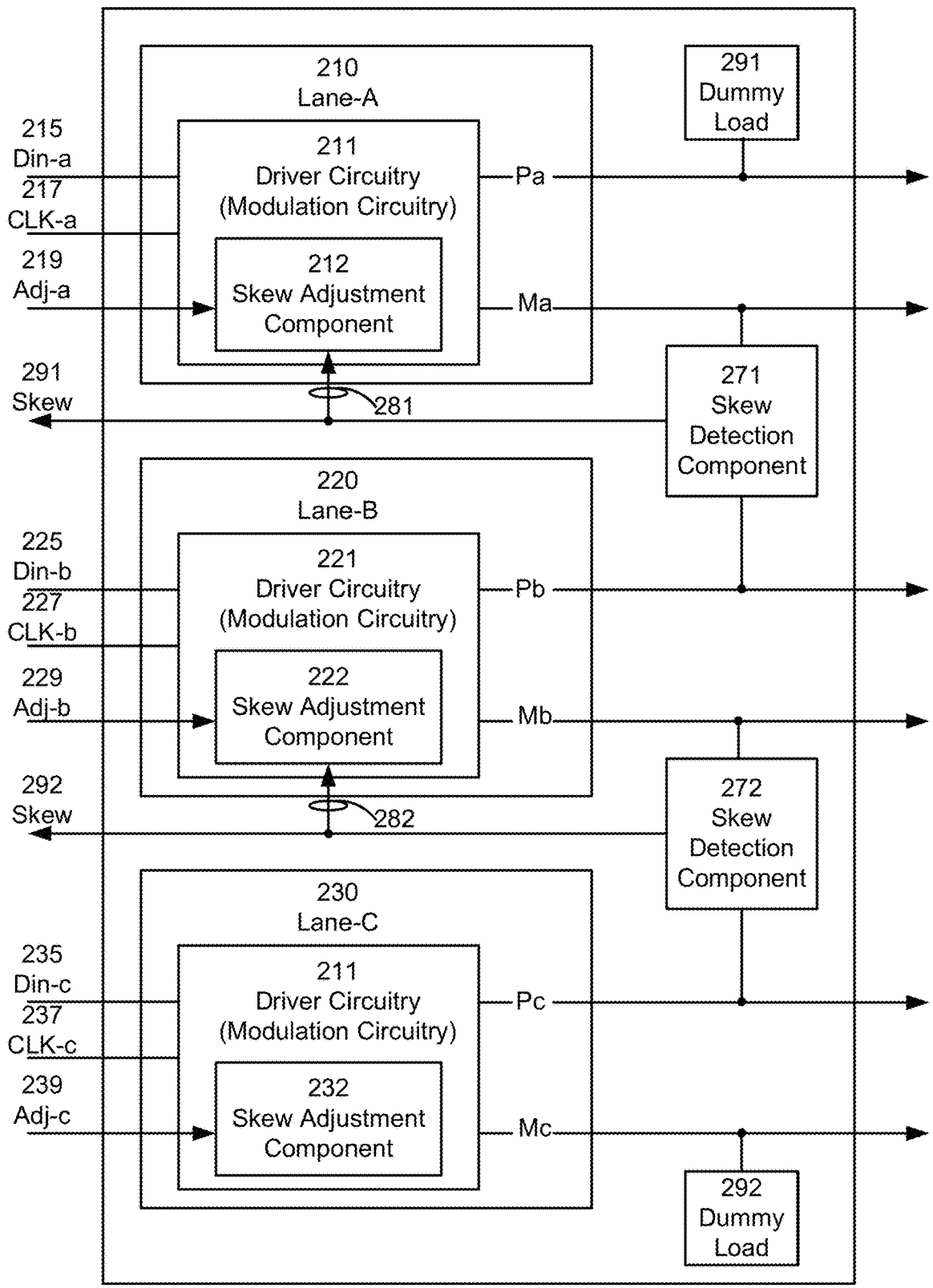
FIG. 2 illustrates a block diagram of an exemplary on-chip optical driver system, in accordance with embodiments of the present invention.

The skew adjustment components can adjust the skew based upon directions from various sources. FIG. 2 illustrates a block diagram of an exemplary on-chip optical driver system 200, in accordance with embodiments of the present invention. Optical driver system 200 includes lanes 210 through 230 and skew detectors 271 through 272. The on-chip optical system 200 can include dummy loads 291 and 292 coupled to the Pa and Mc signals that are not coupled to a skew detector. Lanes 210 through 230 include respective driver/modulation components 211 through 231. Driver/modulation components 211 through 231 include respective skew adjustment components 212 through 232. Data input a through c (Din-a through Din-d) is fed into the respective diver/modulation components 211 through 231. Skew detection components 271 through 272 can forward the skew detection information to skew adjustment components and off chip. The skew adjustment components 212 and 222 can adjust the skew based upon skew adjustment component signals 281 and 282 from the skew detection components 271 through 272 respectively. The skew adjustment components 212 and 222 can adjust the skew based upon directions from skew calibration components in various locations (e.g., included with skew detection components 271 and 272, included in driver circuitry 211 and 222, etc.). The skew adjustment components 212, 222, and 232 can also adjust the skew based upon adjustment instructions Adj-a through Adj-c from off chip.

Figure 3:
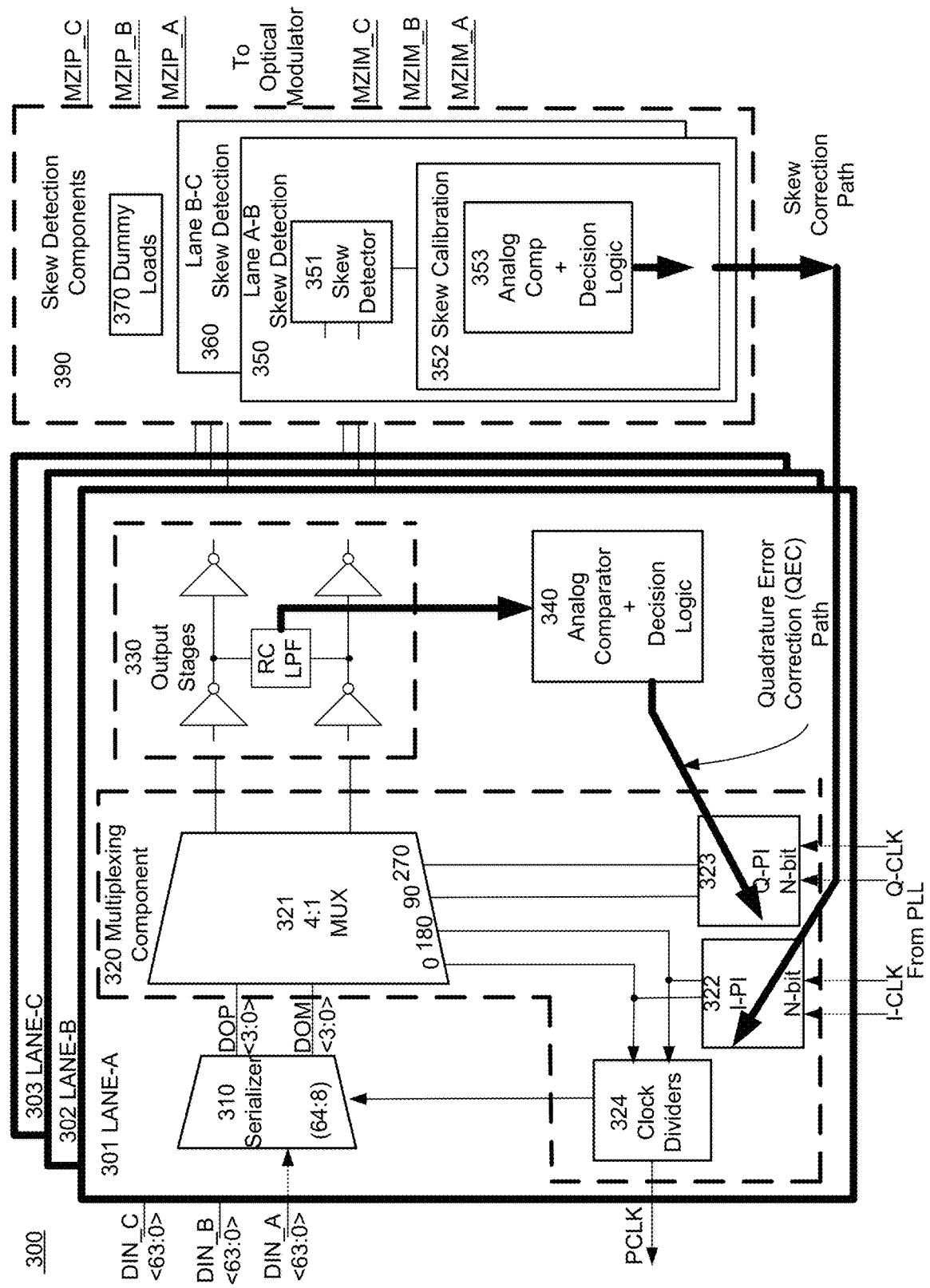
FIG. 3 is a block diagram of an exemplary on-chip optical device driver system, in accordance with embodiments of the present invention.

FIG. 3 is a block diagram of an exemplary on-chip optical device driver system 300, in accordance with embodiments of the present invention. Driver system 300 includes skew detection components 390 and lanes 301, 302, and 303.

Lane-A 301 includes on-chip components such as serializer 310, multiplexing component 320, an output stage 330, and analog comparator decision logic 340. In one embodiment, multiplexing component 320 is a high speed 4:1 multiplexer. Serializer 310 is communicatively coupled to multiplexing component 320 which is communicatively coupled to output stage 330. Analog comparator decision logic 340 is communicatively coupled to multiplexing component 320 and output stage 330. In one embodiment, lane-B 302 and lane-C 303 have similar configurations to lane-A 301.

The components of driver system 300 cooperatively operate to provide modulated driver signals to drive an electro-optical modulator configuration to modulate optical signals. Serializer 310 is configured to receive parallel data signals and forward corresponding serial data signals. Multiplexing component 320 is configured to selectively output an in-phase component and a quadrature component of the serial data signals. Output stage 330 is configured to output signals that modulate an optical signal. Skew detection components 390 are configured to detect skew and the skew calibration component is configured for direct skew adjustment between a first output signal and a second output signal. In one exemplary implementation, analog comparator and decision logic 340 comprises an analog comparator, a digital to analog converter, and a digital finite state machine (FSM) logic. Analog comparator and decision logic 340 can be included in a Quadrature Error Correction (QEC) path and direct Q-PI 323 adjustments to MUX 321 selection controls. The QEC path is typically used to correct output errors caused due to a misalignment of the clocks from Q-PI 323 with respect to I-PI 322. The digital to analog converter can be configured to tune out mismatch errors in the analog comparator.

In one embodiment, multiplexing component 320 comprises multiplexer (MUX) 321, first phase interpolator component 322, second phase interpolator component 323, and clock dividers 324. Clock dividers 324 receive input from the first phase interpolator component 322. The second phase interpolator component 323 can be an N-bit Quadrature Phase Interpolator (Q-PI) component. The first phase interpolator component 322 can be an N-bit In-Phase Interpolator (I-PI) component. Multiplexer 321 is communicatively coupled to first phase interpolator component 322 and second phase interpolator component 323. MUX 321 is configured to selectively output an in-phase component and a quadrature component of the serial data signals based on selection control signals from first phase interpolator component 322 and second phase interpolator component 323. MUX 321, I-PI 322, and Q-PI 323 implements skew adjustments to aspects of a first output signal and a second output signal. Second phase interpolator component 323 is configured to forward quadrature selection signal to the MUX 321. First phase interpolator component 322 is configured to forward an in-phase selection signal to the MUX 321. In one exemplary implementation, first phase interpolator component 322 receives directions from skew calibration component 352 with regards to a skew related adjustments for the in-phase selection signal sent to the MUX 321. Further, the second phase interpolator component 322 receives directions from 340 in the QEC path for the quadrature selection signal sent to the MUX 321 after the skew related adjustments on the first phase interpolator 322.

In one embodiment, skew detection components 390 include lane skew detection components (e.g., 350, 360, etc.) and dummy loads 370. Lane skew detection component 350 detects skew between lanes A and B. Lane skew detection component 360 detects skew between lanes B and C. Dummy loads 370 are coupled to the Pa and Mc signals that are not coupled to a skew detector.

Lane skew detection component 350 includes skew detector 351 and skew calibration component 352. Skew detector 351 is configured to detect a skew difference between the first output signal of lane A (e.g., Ma, etc), and the second output signal of lane B (e.g., Pb, etc). Skew calibration component 352 is configured to direct adjustment of skew between the first output signal and the second output signal. In one exemplary implementation, skew calibration component 352 includes analog comparator and decision logic 353. A skew calibration path flows from skew detection components 390 to in phase interpolator (I-PI) 322. Skew calibration component 352 can be included in a skew correction path and direct I-PI 322 adjustments to MUX 321 selection controls. Lane skew detection component 360 can include a skew detector similar to skew detector 351 and a skew calibration component similar to skew calibration component 352.

In one embodiment, the skew is adjusted so there is zero skew difference between the first output signal and the second output signal. In one exemplary implementation, the skew is adjusted so there is fixed skew difference between the first output signal and the second output signal. The first output signal can be associated with a first modulation lane and the second output signal can be associated with a second modulation lane. In one embodiment, the first output signal and the second output signal can be differential signals (e.g., approximately 180 degrees out of phase, etc.). The first output signal can be considered a positive signal of the first modulation lane and the second output signal can be considered a negative signal of the second modulation lane.

Figure 4:
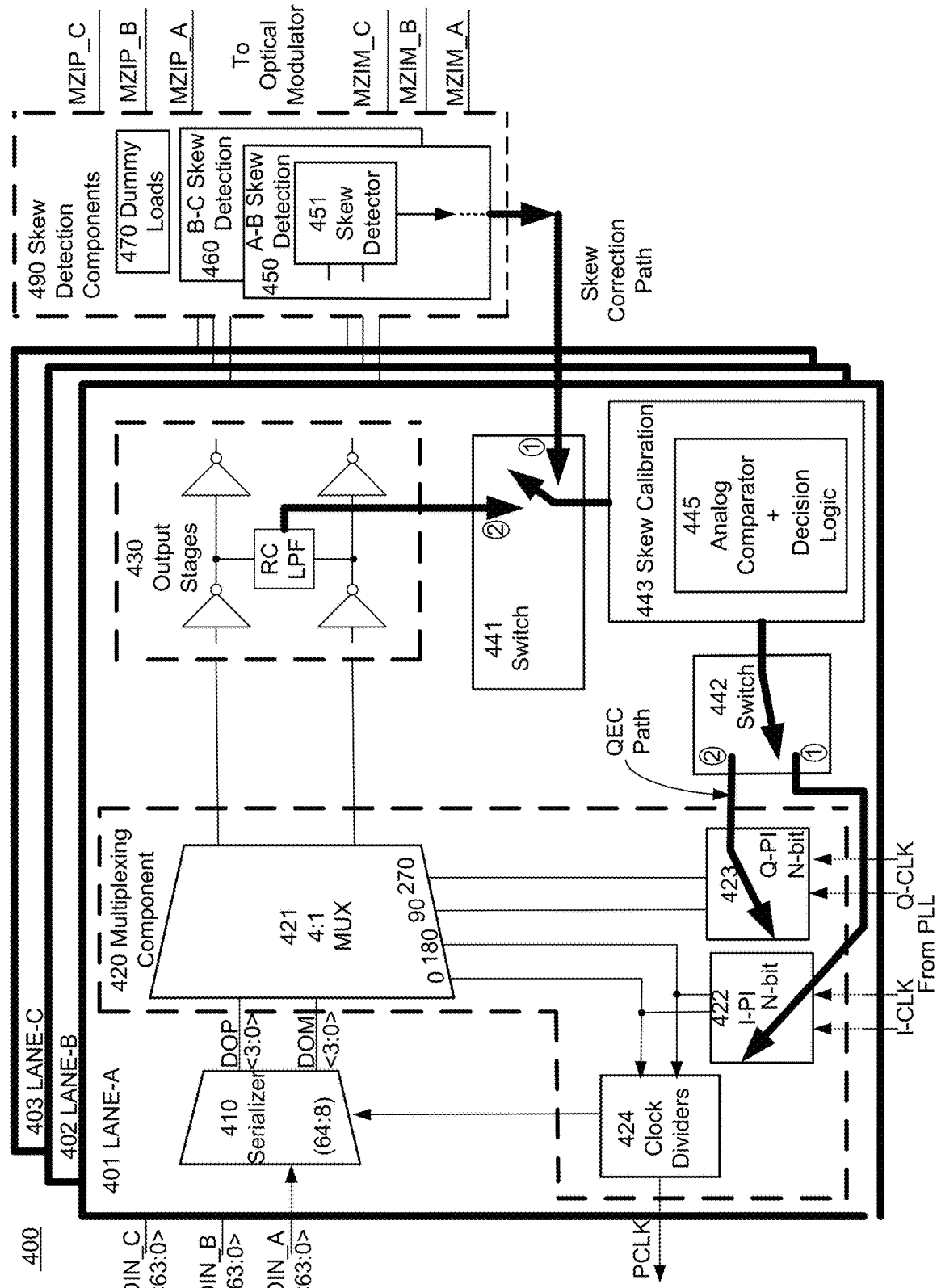
FIG. 4 is a block diagram of an exemplary on-chip optical device driver system, in accordance with embodiments of the present invention.

FIG. 4 is a block diagram of an exemplary on-chip optical device driver system 400, in accordance with embodiments of the present invention. On-chip optical device driver system 400 is similar to on-chip optical device driver system 300, except on-chip optical device driver system 400 skew calibration component 443 includes logic to selectively direct skew correction path adjustments and QEC path adjustments. In one exemplary implementation, skew calibration component 443 leverages hardware components in performing both types of path adjustments.

Driver system 400 includes skew detection components 490 and lanes 401, 402, and 403. Lane-A 401 includes on-chip components such as serializer 410, multiplexing component 420, an output stage 430, and analog comparator decision logic 445. In one embodiment, multiplexing component 420 is a high speed 4:1 multiplexer. Serializer 410 is communicatively coupled to multiplexing component 420 which is communicatively coupled to output stage 430. Analog comparator decision logic 445 is communicatively coupled to multiplexing component 420 and is selectively coupled to output stage 430 and skew detection components 490. In one embodiment, lane-B 402 and lane-C 403 have similar configurations to lane-A 301.

The components of driver system 400 cooperatively operate to provide modulated driver signals to drive an electro-optical modulator configuration to modulate optical signals. Serializer 410 is configured to receive parallel data signals and forward corresponding serial data signals. Multiplexing component 420 is configured to selectively output an in-phase component and a quadrature component of the serial data signals. Output stage 430 is configured to output signals that modulate an optical signal. Skew detection components 490 are configured to detect skew between a first output signal and a second output signal.

In one embodiment, multiplexing component 420 comprises multiplexer (MUX) 421, first phase interpolator component 422, second phase interpolator component 423, and clock dividers 424. Clock dividers 424 receive input from the first phase interpolator component 422. The second phase interpolator component 423 can be an N-bit Quadrature Phase Interpolator (Q-PI) component. The first phase interpolator component 422 can be an N-bit In-Phase Interpolator (I-PI) component. Multiplexer 421 is communicatively coupled to first phase interpolator component 422 and second phase interpolator component 423. MUX 421 is configured to selectively output an in-phase component and a quadrature component of the serial data signals. Second phase interpolator component 423 is configured to forward a quadrature selection signal to the MUX 421. First phase interpolator component 422 is configured to forward an in-phase selection signal to the MUX 421. In one exemplary implementation, first phase interpolator component 422 and second phase interpolator component 423 selectively receive directions from skew calibration component 443 with regards to both the quadrature related adjustments of the quadrature selection signal and skew related adjustments for the in-phase selection signal sent to the MUX 421.

In one embodiment, skew detection components 490 include lane skew detection components (e.g., 450, 460, etc.) and dummy loads 470. Lane skew detection component 450 detects skew between lanes A and B. Lane skew detection component 460 detects skew between lanes B and C. Dummy loads 470 are coupled to the Pa and Mc signals that are not coupled to a skew detector.

Lane skew detection component 450 includes skew detector 451. Skew detector 451 is configured to detect a skew difference between the first output signal of lane A (e.g., Ma, etc), and the second output signal of lane B (e.g., Pb, etc). Lane skew detection component 460 includes a skew detector similar to skew detector 451.

Skew calibration component 443 is shared between a QEC path and a skew correction path. A QEC path and a skew calibration path are selectively formed by switch 411, skew calibration component 443, and switch 442. The skew calibration path flows from skew detection components 490 to first phase interpolator component 422. A QEC path flows from output stage 430 to second phase interpolator component 423. In one exemplary implementation, skew calibration component 443 includes analog comparator and decision logic 445. In one exemplary implementation, analog comparator and decision logic 445 comprises an analog comparator with an offset calibration feature and can be configured to tune out mismatches in the loop.

Figure 5:
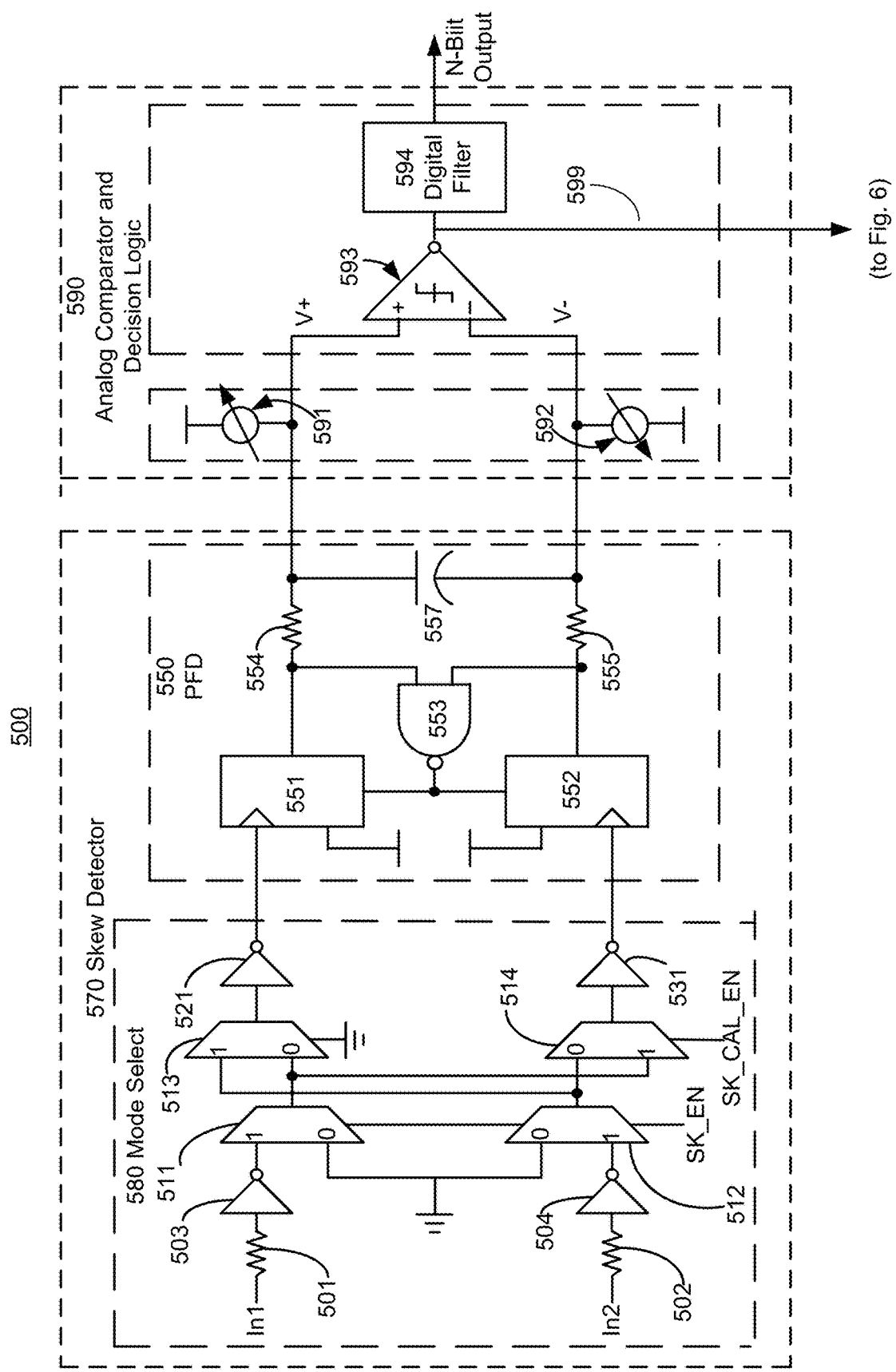
FIG. 5 is an exemplary block diagram of a skew adjustment system, in accordance with embodiments of the present invention.

FIG. 5 is an exemplary block diagram of a skew adjustment system 500, in accordance with embodiments of the present invention. Skew adjustment system 500 includes skew detector 570 and analog comparator and decision logic 590. Analog comparator and decision logic 590 are included in a skew calibration component. In one embodiment, skew detector 570 is similar to skew detector 451 and analog comparator and decision logic 590 is similar to analog comparator and decision logic 445.

Skew detector 570 includes mode select component 580 and Phase Frequency Detector (PFD) 550. Mode select component 580 includes resistors 501 through 502 respectively coupled to buffers 503 and 504 which are respectively coupled to MUX 511 and 512, which are in turn respectively coupled to MUX 513 and 514. MUX 513 is coupled to a buffer chain represented by 521. MUX 514 is coupled to a buffer chain represented by 531. Buffers 521 and 531 are coupled to PFD 550. Resistors 501 and 502 can enable electrostatic discharge (ESD) protection. MUX 511 and 512 selection signals are utilized to enable and disable the skew detection period. MUX 513 and 514 selection signals are utilized to enabled and disabled calibration mode/detect mode and normal/off mode. The MUXs 513 and 514 can also be utilized to implement load balancing. The buffer chains ensure the same or similar signal is sent to the PFD 550. PFD 550 includes registers 551 and 552, logic AND gate 553, resistors 554 and 555, and capacitor 557.

Analog comparator and decision logic 590 includes variable current sources 591 and 592 coupled to analog comparator 593, which is coupled to digital filter 594. In one embodiment, variable current sources 591 and 592 supply digitally adjusted offset currents. In one exemplary implementation, analog comparator and decision logic 590 is shared between QEC path and skew correction path (e.g. similar to analog comparator and decision logic 445, etc.).

In one embodiment, currents are applied or injected. In one exemplary implementation, the currents are introduced by current sources (e.g., 591,592, etc.). The current injection can create a voltage shift. In one embodiment, a skew or offset is adjusted by varying the values of the applied or injected currents so that they are not equal.

If there is a systematic offset for phase detector due to mismatches, it can cause skew offset and should be calibrated out. In one embodiment, a skew detector is an offset compensated skew detector that compensates for phase detector offset. In one exemplary implementation, the skew detector/phase detector offset is removed. Unlike conventional skew detectors (e.g., in phase lock loop, etc.), an offset compensated skew detector reduces the risk of performance impacts associated with a phase detector mismatches. An offset compensated skew detector can also relax design requirements and save design costs. In one exemplary implementation, a comparator (e.g., 353, 445) is a flexible offset programmable comparator.

In accordance with embodiments of the present invention, a reset variable delay control signal 599 is taken from the output of analog comparator 593. As further described in FIG. 6, below, variable delay control signal 599 is used in conjunction with skew adjustment system 600 to change a timing of a reset signal for a lane, in order to eliminate deleterious skew among reset signals.

Figure 6:
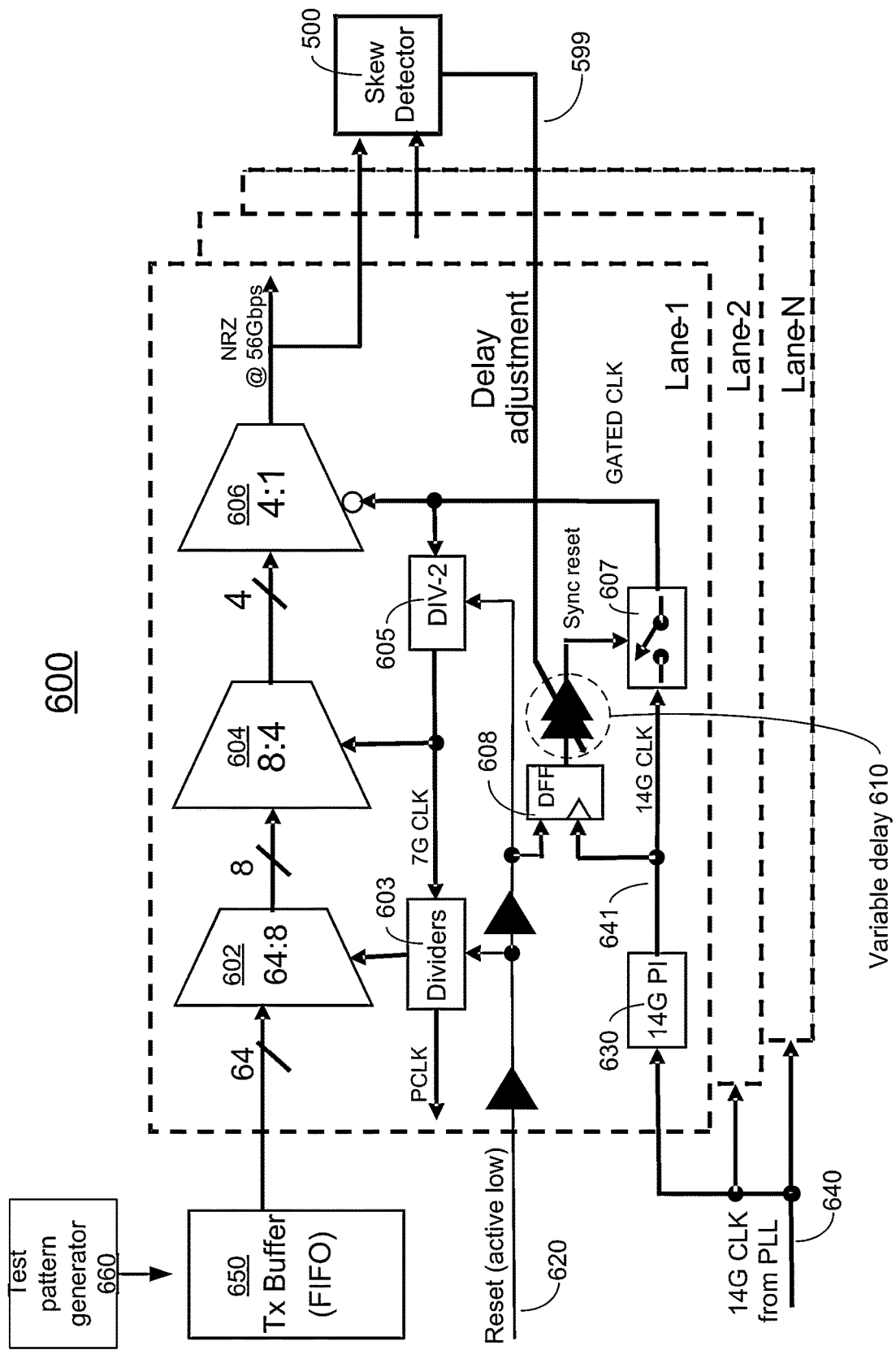
FIG. 6 is an exemplary block diagram of a skew adjustment system, in accordance with embodiments of the present invention.

FIG. 6 is an exemplary block diagram of a skew adjustment system 600, in accordance with embodiments of the present invention. FIG. 6 illustrates some circuitry of a first lane, lane 1, of a multi-lane transmitter. The main clock input signal 640 is received by a phase interpolator 630, to create clock signal 641. Phase interpolator 630 provides a capability of changing the phase of clock 640, e.g., of changing the time location of a rising edge of clock 640. For example, the rising edge of clock 641 may be delayed with respect to clock 640. The identified clock rate of 14 GHz is exemplary.

Clock 641 may be gated, e.g., turned off, by switch 607. When passed by switch 607, clock 641 drives multiplexor 606 and divider 605.

Transmit buffer 650 provides data to lane-1 64 bits wide. A first multiplexor 601 selects 8 bits of the 64 based on a clocking signal from dividers 603. A second multiplexor 604 selects 4 bits of the 8, based on a clocking signal from divider 605, which divides the clock signal 641 by two. A third multiplexor 606 selects 1 bit of the 4, based on a gated full speed clocking signal, output from switch 607. The output of multiplexor 606 drives a portion of waveguide 105 (FIG. 1), in some embodiments. The output of multiplexor 606 also drives an input of skew detector 500, e.g., as signal "In1" (FIG. 5). Similarly, a corresponding signal from Lane-2 drives an input of skew detector 500, e.g., as signal "In2."

Switch 607 is controlled by the output of D-type flip flop 608 through variable delay element 610, which is triggered by the common reset signal 620. Variable delay element 610 may comprise any well-known suitable circuitry. Common reset signal 620 is applied to all lanes. Common reset signal 620 serves to reset the dividers 603 and 605. However, dividers 603, 605, and the multiplexors 602, 604, 606 do not receive an active clock signal until clock 641 is passed by switch 607. Variable delay element 610 is controlled by variable delay control signal 599 (from FIG. 5). Thus, the variable delay 610 controls when the clocked elements dividers 603, 605, and the multiplexors 602, 604, 606 receive an active clock signal and actually being operation.

Delay control signal 599 is specific to a detected skew between lane 1 and land 2 (FIG. 5). It is appreciated that specific delay control signal 599 is not provided to lane 2. Lane 2 may be provided with a similar, but different signal, for example, based on a skew comparison of lane 2 to lane 3. In accordance with embodiments of the present invention, the time at which the clock 641 is provided to the dividers 603, 605, and the multiplexors 602, 604, 606, may be different for lane 1 in comparison to when the clock is provided to the corresponding elements of lane 2. By this novel method, a clock skew between lanes may be beneficially adjusted.

Figure 7:
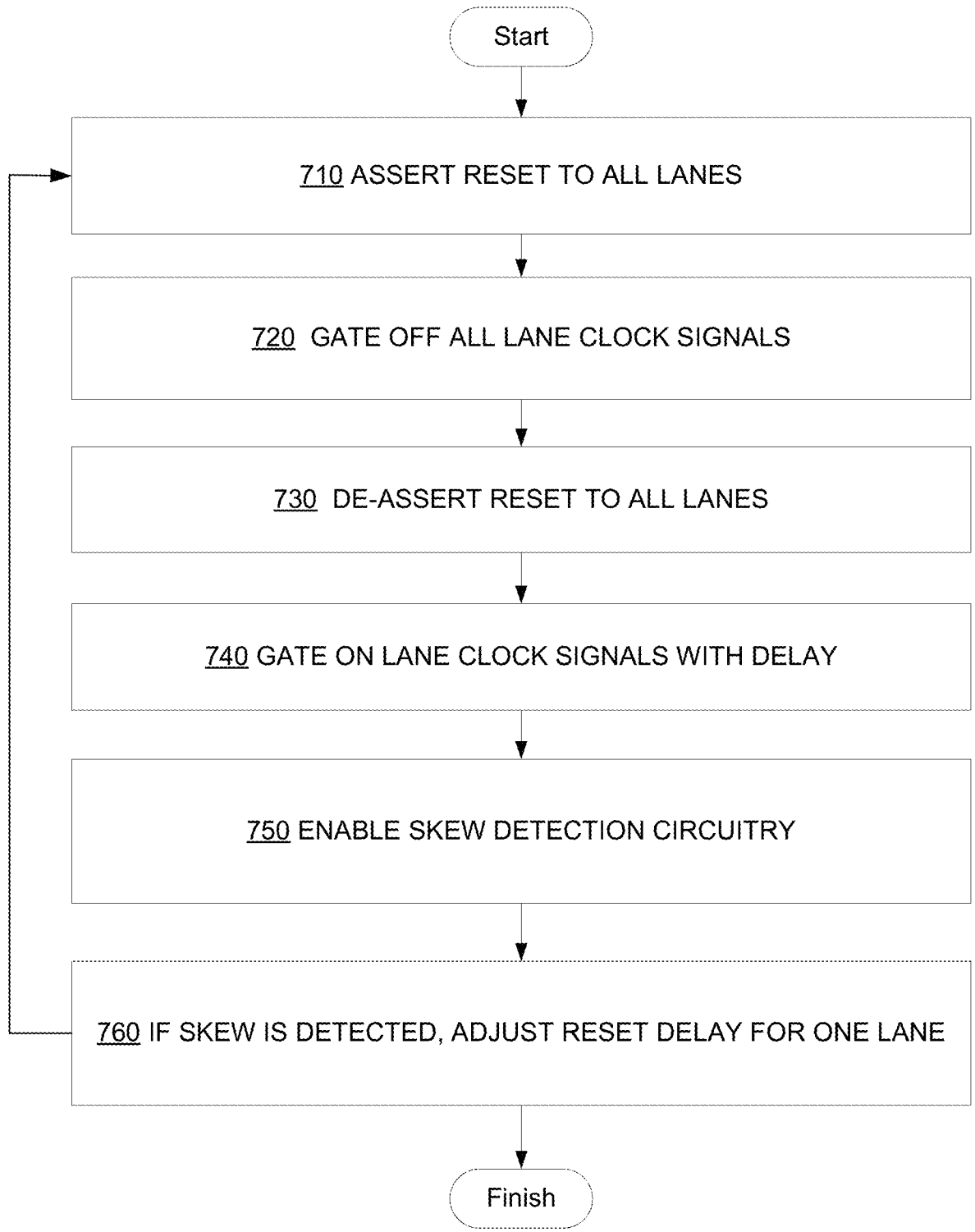
FIG. 7 illustrates an exemplary method of adjusting skew between lanes of a multi-lane transmitter, in accordance with embodiments of the present invention.

FIG. 7 illustrates an exemplary method 700 of adjusting skew between lanes of a multi-lane transmitter, in accordance with embodiments of the present invention. In 710, a reset line to all lanes, e.g., common reset signal 620 (FIG. 6), is asserted. In 720, the clock signals within the lanes are gated off in response to assertion of the reset line. In 730, the reset line is asserted to all cards.

In 740, the lane clock signals are gated on according to the prescribed delay. There may be a default delay for a first pass through process 700. In 750, skew detection circuitry, e.g., skew adjustment system 500 of FIG. 5, is enabled. In 760, if skew is observed between two lanes, a reset delay, e.g., a delay produced by variable delay element 610 (FIG. 6), is adjusted, and flow continues at 710.

It is appreciated that adjusting a reset delay for first lane, but not for a second lane, the lane-specific clock signal of the first lane will be skewed relative to that of the second lane. In this novel manner, a clock skew between lanes may be beneficially adjusted.

In one embodiment, adjusting the skew includes enabling a calibration mode, and performing an offset adjustment process on the first output signal with respect to the second output signal.

Figure 8:
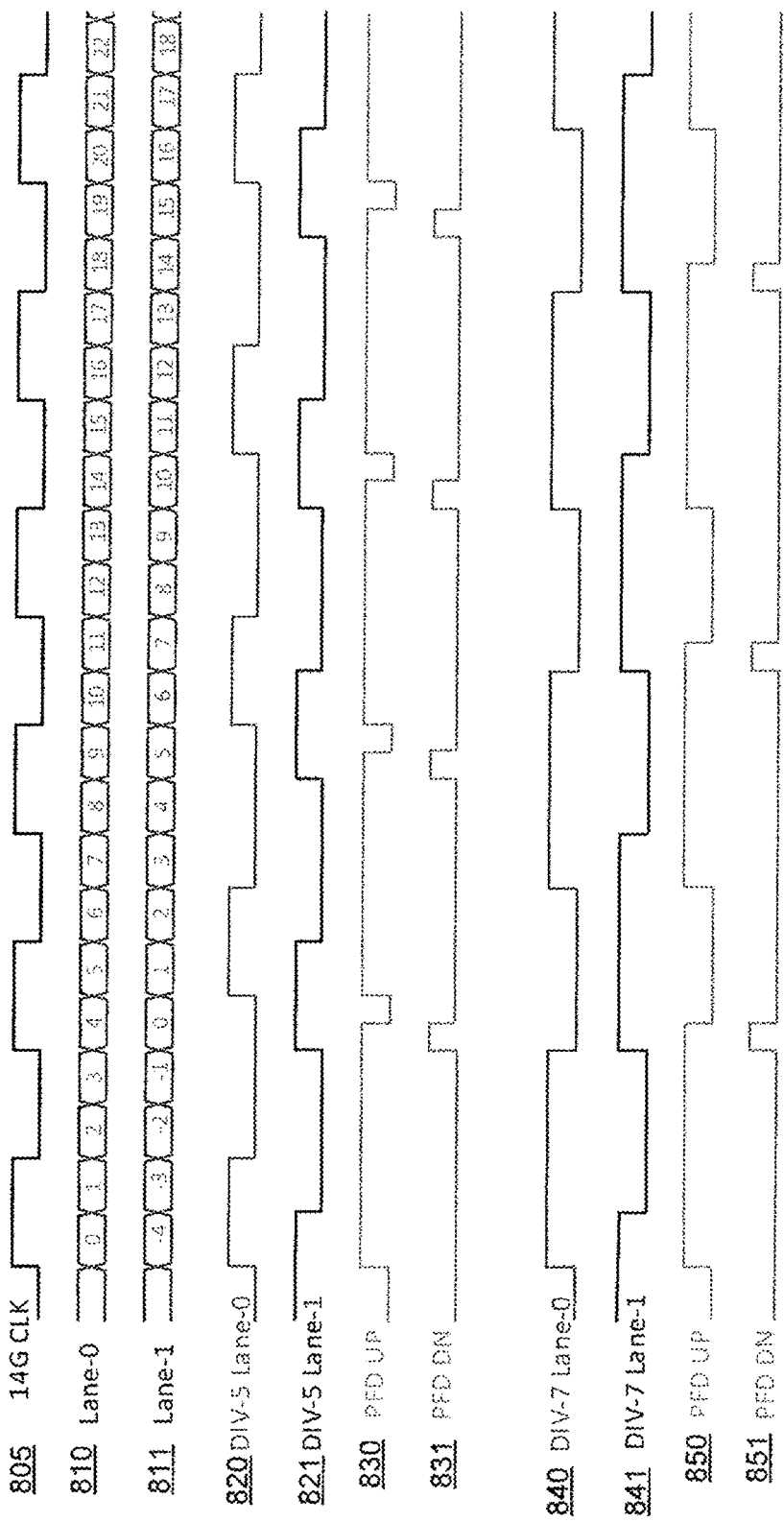
FIG. 8 illustrates exemplary beneficial test data patterns 800 to detect skew between lanes of a multi-lane transmitter, in accordance with embodiments of the present invention.

FIG. 8 illustrates exemplary beneficial test data patterns 800 to detect skew between lanes of a multi-lane transmitter, in accordance with embodiments of the present invention. Test patterns may be generated by test pattern generator 660 (FIG. 6) and loaded into Tx Buffer 650 (FIG. 6) and propagated through two lanes to determine skew, in accordance with embodiments of the present invention.

Signal 805 is the main clock signal, e.g., clock 640 (FIG. 6). Exemplary data frames 810 and 811 illustrate a four-symbol skew between lane 0 and lane 1. Test data 820 illustrates a clock signal with a period of five symbols. Test data 821 illustrates a clock signal with a period of five symbols, offset by one symbol relative to test data 820.

Signal 830 illustrates a leading output of a phase frequency detector for the exemplary skew illustrated by signals 810 and 811, for example, an output of register 551 of Phase Frequency Detector (PFD) 550 of FIG. 5. Signal 831 illustrates the lagging output of a phase frequency detector, for example, register 552 of Phase Frequency Detector (PFD) 550 of FIG. 5. In general the outputs of the phase frequency detector inform the magnitude and direction of adjustments to a variable clock start delay, for example, to variable delay 610 of FIG. 6.

FIG. 8 further illustrates test data 840 and 841 with a period of seven symbols. Signals 850 and 851 illustrate the leading and lagging outputs of a phase frequency detector for the exemplary skew illustrated by Signals 810 and 811.

In accordance with embodiments of the present invention, sending multiple test data patterns though multiple lanes of a multi-lane transmitter may identify any given skew between lanes. For example, the 5 symbol test data 820, 821, may not identify a 20 symbol skew. However, such a 20 symbol skew would be identified by 7 symbol test data 840, 841. Similarly, 7 symbol test data 840, 841 may not be able to identify a 28 symbol skew. Beneficially, the 5 symbol test data 820, 821 would identify a 28 symbol skew.

In accordance with embodiments of the present invention, the different symbol sizes for the symbol test data may be based on prime numbers having a least common multiple greater than a maximum expected size of a skew. For example, symbol size test data of 5 and 7 in the present example may detect all skews up to a 35 (5×7) symbol skew.

Embodiments in accordance with the present invention provide systems and methods for closed loop lane synchronization for optical modulation.

Various embodiments of the invention are thus described. While the present invention has been described in particular embodiments, it should be appreciated that the invention should not be construed as limited by such embodiments, but rather construed according to the below claims.

What is claimed is:

1. A system for transmitting signals via serial links, comprising:
    a plurality of lanes for combining data onto a transmission medium, comprising:
        a first lane comprising a first modulation driver signal and a second modulation driver signal;
        a second lane comprising a first modulation driver signal and a second modulation driver signal;
    a skew detector electrically coupled to a first output of a first modulation driver of said first lane of said plurality of lanes and electrically coupled to a second output of a second modulation driver of said second lane of said plurality of lanes configured to detect skew among said first lane and said second lane; and
    a variable delay circuit controlled by said skew detector, configured to delay the start of a clock signal to circuitry of one of said plurality of lanes.

2. The system of claim 1 wherein the variable delay circuit is configured to delay the clock signal to the circuitry of one of said plurality of lanes such that the skew between the lanes is adjusted.

3. The system of claim 2 further comprising a test pattern generator configured to supply test patterns to said plurality of lanes to be used to detect said skew among two of said plurality of lanes.

4. The system of claim 3 wherein said test patterns comprise at least two test patterns based on different numbers of symbols.

5. The system of claim 4 wherein the at least two test patterns comprise different prime numbers of symbols.

6. The system of claim 5 wherein the at least two test patterns comprise a least common multiple of their symbol numbers that is greater than an expected size of a skew in symbols.

7. The system of claim 4 wherein the skew detector is configured to control a common reset signal for resetting the plurality of lanes and to assert said common reset signal if an unintended skew is detected between any pair of lanes.

8. A system for transmitting signals via serial links, comprising:
- a plurality of lanes for combining data onto a transmission medium, comprising:
  - a first lane comprising a first modulation driver signal and a second modulation driver signal;
  - a second lane comprising a first modulation driver signal and a second modulation driver signal; and
- a skew adjustment circuit configured to adjust skew between said first lane and said second lane of said plurality of lanes in a closed loop manner based on detecting skew between outputs of modulation drivers corresponding to said first modulation driver signal of said first lane and said second modulation driver signal of said second lane,
- wherein the skew adjustment circuit comprises a variable delay circuit that delays a start of a clock signal to circuitry of a lane.

9. The system of claim 8 wherein a skew detector is used to control the skew adjustment circuit and a common reset signal of the plurality of lanes.

10. The system of claim 8 wherein the skew adjustment circuit is configured to introduce an intentional skew between two lanes.

11. The system of claim 8 further comprising a plurality of said skew adjustment circuits, wherein skews between more than two lanes of said plurality of lanes are adjusted relative to each other by sequentially adjusting skew between all lanes, one pair at a time.

12. The system of claim 8 wherein the skew adjustment circuit is configured to introduce intentional skews between multiple lanes.

13. The system of claim 8 wherein a skew detector is used to control the skew adjustment circuit to adjust the start of a clock to one lane and assert a common reset signal of the plurality of lanes.

14. A system for transmitting signals via optical serial links, comprising:
- a plurality of lanes for combining independent data onto an optical transmission waveguide; and
- a skew adjustment component for each of the plurality of lanes, configured to adjust skew of a respective lane responsive to an output of a skew detector, wherein the skew adjustment component comprises a variable delay circuit controlled by said skew detector, configured to delay a start of a clock signal to circuitry of one of said plurality of lanes,
- wherein the skew detector is configured to detect skew among two adjacent lanes, and
- wherein said skew detector is configured to sense outputs of modulation drivers corresponding to said two adjacent lanes.

15. The system of claim 14 wherein the variable delay circuit is configured to delay the clock signal to circuitry of one of said plurality of lanes such that the skew between the lanes is adjusted.

16. The system of claim 14 further comprising a test pattern generator configured to supply test patterns to said plurality of lanes to be used to detect said skew among said two adjacent lanes.

17. The system of claim 16 wherein said test patterns comprise at least two test patterns based on different numbers of symbols.

18. The system of claim 14 wherein the skew detector is configured to control a common reset signal for resetting the plurality of lanes and to assert said common reset signal if an unintended skew is detected between any pair of lanes.

19. The system of claim 14 wherein the skew detector is used to control the skew adjustment component and a common reset signal of the plurality of lanes.

* * * * *